United States Patent
Swart et al.

(10) Patent No.: US 9,032,416 B2
(45) Date of Patent: May 12, 2015

(54) LOAD BALANCING USING PROGRESSIVE SAMPLING BASED ON LOAD BALANCING QUALITY TARGETS

(75) Inventors: Garret Swart, Palo Alto, CA (US); Smriti R. Ramakrishnan, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 188 days.

(21) Appl. No.: 13/561,383

(22) Filed: Jul. 30, 2012

(65) Prior Publication Data
US 2014/0033223 A1 Jan. 30, 2014

(51) Int. Cl.
*G06F 9/46* (2006.01)
*G06F 9/50* (2006.01)

(52) U.S. Cl.
CPC ............ *G06F 9/5066* (2013.01); *G06F 9/5083* (2013.01); *G06F 2209/5022* (2013.01)

(58) Field of Classification Search
None
See application file for complete search history.

(56) References Cited

U.S. PATENT DOCUMENTS

| | | | | |
|---|---|---|---|---|
| 6,119,174 | A * | 9/2000 | Borowsky et al. | 710/15 |
| 8,543,690 | B1 * | 9/2013 | Zeitoun et al. | 709/224 |
| 8,635,204 | B1 * | 1/2014 | Xie et al. | 707/709 |
| 2007/0112723 | A1 * | 5/2007 | Alvarez et al. | 707/2 |
| 2007/0174335 | A1 * | 7/2007 | Konig et al. | 707/104.1 |
| 2011/0320184 | A1 * | 12/2011 | Beyer et al. | 703/22 |
| 2012/0131591 | A1 * | 5/2012 | Moorthi et al. | 718/104 |
| 2012/0222097 | A1 * | 8/2012 | Wilson et al. | 726/5 |
| 2012/0246324 | A1 * | 9/2012 | Kan | 709/226 |
| 2012/0259801 | A1 * | 10/2012 | Ji et al. | 706/12 |
| 2012/0311581 | A1 * | 12/2012 | Balmin et al. | 718/100 |
| 2013/0144593 | A1 * | 6/2013 | Och et al. | 704/2 |

OTHER PUBLICATIONS

Ramakrishnan et al., "Progressive Sampling for Balancing MapReduce Skew", 12 pages, Oct. 14-17, 2012.
Silberstein et al., "Efficient Bulk Insertion into a Distributed Ordered Table", SIGMOD 2008, Jun. 9-12, 2008, ACM, 14 pages.
Lin. J, "The Curse of Zipf and Limits to Parallelization: A Look At the Stragglers Problem in MapReduce", 2009, 6 pages.
Kwon et al., "SkewTune: Mitigating Skew in MapReduce Applications", Proceedings of the International Conference on Management of Data, May 2012, 12 pages.

(Continued)

*Primary Examiner* — Emerson Puente
*Assistant Examiner* — Dong Kim
(74) *Attorney, Agent, or Firm* — Vista IP Law Group, LLP

(57) ABSTRACT

A method, system, and computer program product for of load balancing in a parallel map/reduce paradigm. The method commences by sampling a first set of input records, and forming a prospective load balancing assignment by assigning the first set of input records to the plurality of worker tasks based on a workload estimate for each of the worker tasks. To measure the prospective load balancing assignment, the method compares the workload variance over the plurality of worker tasks to a workload variance target, and also calculates a confidence level based on the sampled first set of input records. If the measured quality of the prospective load balancing assignment is not yet achieved, then the method samples additional input records; for example when the calculated workload variance is greater than the maximum workload variance target or when the calculated confidence level is lower than a confidence level threshold.

20 Claims, 6 Drawing Sheets

(56) References Cited

OTHER PUBLICATIONS

Gufler et al., "Handling Data Skew in MapReduce", Closer 2011—Proceedings of the 1st International Conference on Cloud Computing and Services Science, Noordwijkerhout, Netherlands, May, 7-9, 2011, pp. 574-583.

Seshadri, S. et al., 1992. Sampling Issues in Parallel Database Systems. In Proceedings of the 3rd International Conference on Extending Database Technology: Advances in Database Technology (EDBT '92), Alain Pirotte, Claude Delobel, and Georg Gottlob (Eds.). Springer-Verlag, London, UK, 328-343.

* cited by examiner

US 9,032,416 B2

LOAD BALANCING USING PROGRESSIVE SAMPLING BASED ON LOAD BALANCING QUALITY TARGETS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of load balancing in a parallel map/reduce paradigm and more particularly to techniques for load balancing using progressive sampling to achieve load balancing quality targets with an acceptable level of confidence.

BACKGROUND

Some embodiments of the present disclosure are directed to an improved approach for implementing load balancing using progressive sampling to achieve load balancing quality targets.

Good parallel program scalability derives from being able to balance workloads evenly across all available computational resources. In the context of massive data stores and retrieval systems (e.g., Hadoop) a MapReduce job can be managed under a parallel programming paradigm where programmers specify:
 A map task (e.g., Hadoop map function) running on a computer, which map task processes input key/value pairs (and generates an intermediate set of key/value pairs), and
 A reduce task (e.g., Hadoop reduce function) running on a computer, which reduce task processes the intermediate key/value pairs and generates an output set of key/value pairs.

In this paradigm, the MapReduce job can parallelize flows such that a flow applies a map function to every input record and then runs the reduce function once for each distinct intermediate key. Generally, the overall execution time of a MapReduce job is determined by slowest single flow. An ideal parallelized assignment is one where all flows complete their workload at the same time; that is, there is zero or near zero skew between the completion times of any of the flows.

One approach is to statically-assign workload to the reducers. However, reducer data skew can occur when too many reduce-keys are assigned to the same reduce task. Moreover, the nature of the workload may not be known a priori, and any attempt to statically assign a reduce-key is merely a guess, and the skew might turn out to be quite significant (e.g., in the case of a bad guess of a static assignment). Other legacy approaches, such as performing hashing to assign a workload to the reducers, assumes a near constant workload per work item, which assumption might turn out to be an egregiously bad assumption. Moreover, hashing as a partitioning strategy does not work in applications such as sorting, which require alternate techniques such as range partitioning.

The aforementioned approaches do not support load balancing using progressive sampling to achieve load balancing quality targets. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for load balancing using progressive sampling to achieve load balancing quality targets.

Certain method embodiments commence by sampling a first set of input records, and forming a prospective static load balancing assignment by assigning the first set of input records for processing by a plurality of worker tasks based on a workload estimate for each of the worker tasks. To measure the prospective quality of static load balancing assignment, the method compares the workload variance, as computed over the sampled input records, over the plurality of worker tasks to a workload variance target. The target workload variance is a function of load balancing quality targets such as a maximum acceptable variation of measured workload from a target workload and the target level of confidence that this maximum will not be exceeded over the plurality of worker tasks. If the measured quality of the prospective static load balancing assignment is not yet achieved, then the method makes a hypothesis, and based on the hypothesis proceeds to sample additional input records. A new hypothesis is generated when the calculated workload variance is greater than the maximum workload variance target, which could imply that either the workload may exceed the maximum acceptable variation or that the confidence level is lower than a target confidence level or both.

Method embodiments iteratively continue sampling an additional number of input records until a stopping condition is reached. In certain embodiments, the stopping condition is based on a resource use limit. And, in certain embodiments, the stopping condition is based on a tradeoff between the costs of performing the additional sampling versus a potentially improved workload assignment.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1:
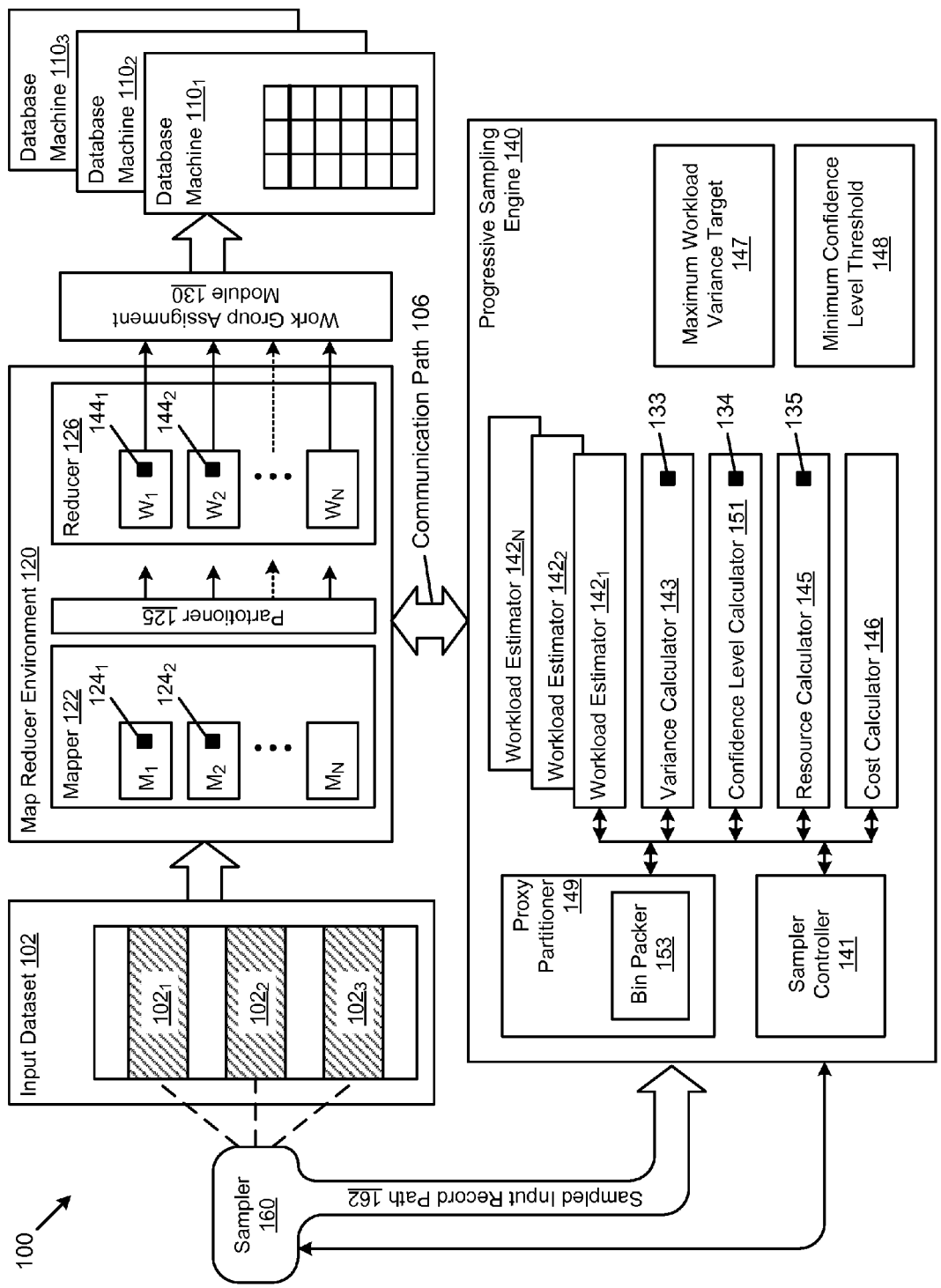
FIG. 1 is a block diagram of a system for implementing load balancing using progressive sampling to achieve load balancing quality targets, according to some embodiments.

Some embodiments of the present disclosure are directed to an improved approach for implementing load balancing using progressive sampling to achieve load balancing quality targets. More particularly, disclosed herein are environments, methods, and systems for implementing load balancing using progressive sampling to achieve load balancing quality targets.

Overview

The technique known as load balancing often includes the process of assigning portions of a task to be performed to processors in a parallel system such that the elapsed time to completion of the overall task to be performed is minimized. The technique of static load balancing refers to a load balancing technique that can be performed in an a priori fashion, where the static assignment (of work to processors or "workers", or of work to "worker tasks", or of work to "worker processes") is based on looking at a data item rather than an assignment based on the dynamic state of the system. In some cases dynamic load balancing performs better than static load balancing, however static load balancing is the only type of reducer load balancing possible when using Apache Hadoop, a popular open source implementation of the MapReduce parallel programming paradigm. In some approaches, forming a prospective static load balancing assignment relies on inputs that are configured by the end user. Such user configurations may (or may not) result in a good static assignment—that is, such user configurations may (or may not) result in a static assignment that results in zero or near zero skew among the workers.

For example, and referring specifically to aspects of a MapReduce partitioning scheme for Hadoop, the goal of MapReduce partitioning load balancing is to generate a MapReduce partitioning scheme that assigns approximately the same amount of work to all reducers (e.g., workers). Two properties serve to influence the quality of the static load balancing:

- A maximum load factor, referring to the maximum user-expressed tolerance for differences between the most heavily loaded worker and the average worker load; and
- Confidence, referring to the statistical confidence that no worker could exceed the given maximum load factor.

As can be understood, a better (e.g., more accurate) assignment resulting in a lower cost for running the job can be generated as more is known about the workload. However, there is a cost associated with obtaining the needed information to know more about the workload, and the cost of obtaining the needed information to know more about the workload is in counterbalance to achieving a better, more accurate assignment that results in a lower cost for running the job Some embodiments implement a sampler. In some cases, the sampler calculates an expected reducer load factor and compares that calculation to the given maximum load factor in order to produce a metric that models the quality of a partitioning scheme. The aforementioned load factor is codified as a metric that indicates how much a reducer's load deviates from a perfectly balanced reducer load (a load factor of one indicates a perfectly balanced load, with no workers finishing later than any other worker).

Continuing this example, the value of a load factor refers to the quantity (1+deltaLoadFactor). Thus, a deltaLoadFactor value of 0.05 indicates that no reducer is overloaded by more than 5%. The sampler can guarantee a particular value for a load factor within the bounds of a statistical confidence level. Such a statistical confidence level can be referred to using the quantity loadConfidence. A loadConfidence value of 0.95 means that any reducer's load factor exceeds a deltaLoadFactor in only 5% of the cases. More sampling (e.g., running the sampler longer to retrieve and evaluate more samples) improves confidence, however there is a tradeoff between the execution time and/or other costs of running the sampler versus the quality of any load balancing assignment. That is, lower values of deltaLoadFactor and higher values of loadConfidence results in more balanced reducer loads at the expense of longer sampling times. In some of the embodiments described herein, the exemplary value for deltaLoadFactor is 0.05 and the exemplary value for loadConfidence is 0.95.

The above exemplary values are merely for purposes of discussion. What is needed is the herein-disclosed automatic approach for optimizing the tradeoff between the costs of sampling versus a resulting improved static workload assignment to workers. As is further discussed below, embodiments implement a technique whereby a hypothesis is made, progressive sampling is performed to test the hypothesis, a new hypothesis is made, and this cycle is repeated until a specified load balancing quality level is reached with sufficiently high confidence.

Descriptions of Exemplary Embodiments

FIG. 1 is a block diagram of a system 100 for implementing load balancing using progressive sampling to achieve load balancing quality targets. As an option, the present system 100 may be implemented in the context of the architecture and functionality of the embodiments described herein. Also, the system 100 or any aspect therein may be implemented in any desired environment.

The system 100 includes an input dataset 102 in communication with a map reducer environment 120. The input dataset 102 comprises input records that are distributed across disparate locations. For example, input record block $102_1$ may be located on a first machine, and an input record block $102_2$ may be located on a second machine, and input record block $102_3$ may be located on a third machine, and so on. Any individual input record or group of input records can be accessed individually or as a block or other group.

Within the shown map reducer environment 120, a mapper 122 is comprised of a plurality of map tasks (e.g., $M_1$, $M_2$, and $M_N$). Similarly, within the shown map reducer environment 120, a reducer 126 is comprised of a plurality of reducer workers (e.g., worker task $W_1$, worker task $W_2$, and worker task $W_N$). Such worker tasks can be implemented or embodied in any process or processes or other processing entities, and such processing entities can include processes, threads, tasks, CPUs, nodes, and/or networked computing stations. Shown as between the mapper 122 and the reducer 126 is a partitioner 125. In operation, a mapper applies a deterministic map function (e.g., implemented in a mapper such as $M_1$) and each considered input record results in zero or more work records (e.g., work record $124_1$, work record $124_2$, etc.). The work records are grouped into a plurality of instances of workgroups (e.g., workgroup $144_1$, workgroup $144_2$, etc.) based on a deterministic partitioning function (e.g., implemented in a partitioner 125). The workgroups are assigned to machines and a particular reduce function operates on each workgroup (e.g., running on the machine assigned to process that workgroup). As earlier suggested, the partitioner 125 in a map reducer environment can implement a commutator style of partitioning, or the partitioner 125 in a map reducer environment can implement a static assignment provided by a system component such as the progressive sampling engine.

The processing of a workgroup induces a load on the machine to which it is assigned. This workgroup load variable is a random variable that is a non-decreasing workgroup load function of a set of random variables that are estimated by sampling the work records that are assigned to a particular workgroup. These sampled variables can include the number of work records and the number of bytes used to represent the work records in a particular workgroup. If the workgroup load function is a linear combination of these random variables, and the subgroups are defined using splitting (see descriptions below under the heading, "ADDITIONAL EMBODIMENTS USING BIN PACKING", and see the discussion of FIG. 4), then the workload variance calculation has a closed form and the calculation of the number of samples needed also has a closed form. As shown, a sampler 160 can access any work record, and sampler 160 can communicate with a sampler controller 141. In turn the sampler controller 141 can receive sample input records over the sampled input record path 162. The samples, together with their constituent random variables can be operated upon by any one or more of the modules within the progressive sampling engine 140. For example, a proxy partitioner 149 can receive samples together with their constituent random variables, and known constraints such as the number of worker tasks and the load target, and can perform a shadow partitioning of workgroups to worker tasks so as to calculate expected workloads for each worker task. In some embodiments, a proxy partitioner will perform bin packing (e.g., using a bin packer 153) so as to improve the quality of the load balancing.

Still referring to the system 100 of FIG. 1, the flow as shown includes apportioning tasks to database machines. In some situations the work can be assigned to a single database machine. In a more general case, work is assigned to multiple database machines (e.g., database machine $110_1$, database machine $110_2$, database machine $110_3$, etc.). In a commercial setting the load on a given database machine is actively managed in real-time so as to provide a minimum service level agreement (SLA). Active management to deliver performance to an SLA can be achieved as follows: Given a workgroup assignment (see work group assignment module 130), the workgroup load for a particular worker task is a random variable defined by the sum of the loads induced by the workgroups assigned to a respective worker task. The load-factor is the load divided by the load-target which is the sum of the load associated with all of the workgroups, divided by the number of worker tasks. In some embodiments, the load on a database machine is used as the load in calculations to determine the load-factor.

In summary, and still referring to the embodiment of FIG. 1, the system 100 serves to host a computer implemented method for static load balancing using progressive sampling to achieve a load balancing quality target over a plurality of worker tasks with a level of confidence (e.g., at or near a minimum confidence level threshold 148). The sampler 160 serves to sample a first set of input records (e.g., from input record block $102_1$, from input record block $102_2$, etc.). Then, based on an assignment of the first set of input records to workers, a workload estimator (e.g., workload estimator $142_1$, workload estimator $142_2$, workload estimator $142_N$, etc.) can be used to determine a workload estimate for each of the workers. In exemplary cases, a communication path 106 can be used to communicate between a map reducer environment 120 and any workload estimator. A progressive sampling engine 140 can spawn or launch a workload estimator for each worker (e.g., worker task $W_1$, worker task $W_2$, etc.). Having a workload estimate for each worker, then a variance calculator 143 serves to compare the calculated workload variance 133 (e.g., the variance over the plurality of worker tasks) to a maximum workload variance target 147. Further, the extent of the sampling can be used to calculate a confidence level 134 based on a set of sampled of input records (e.g., using a confidence level calculator 151).

Having a calculated workload variance and a calculated instance of confidence level 134, then when the calculated workload variance is greater than the maximum workload variance target, a hypothesis can be formed in expectation of reducing the workload difference or, in expectation of staying within a maximum variation from a target workload at a target confidence level. For example, one hypothesis might be: Sample and evaluate a small number of additional input records in the expectation that sampling the additional small number of samples would improve the confidence level by a large amount. Or, an alternate hypothesis might be: It will be necessary to sample and evaluate a large number of additional input records in order to improve the confidence level by only a small amount. Techniques for forming the aforementioned hypotheses are discussed infra. Iterations to form and test a hypothesis can continue in this manner (e.g., adding additional samples to a sample count) until a minimum confidence level is reached, or until too much time or too many resources have been spent in the exploration. Indeed, various stopping conditions may be present, and when present, the iteration loop exits. For example, a resource calculator 145 might calculate that a resource use limit 135 has been exceeded, or otherwise determine that too much time or too many resources have been spent in the hypothesis/exploration activities. Or, a cost calculator 146 can be employed to estimate if the cost of additional sampling might outweigh the expected benefit.

Now, assuming the sample size is sufficiently large so as to achieve a workload variance less than the maximum workload variance target, then the partitioner can be provided with a static load balancing assignment, and the progressive sampling engine 140 can communicate the prospective static load balancing assignment to a partitioner 125, which in turn can observe the prospective static load balancing assignment when assigning work to the reducers 126. Of course, any of the static load balancing assignments produced by any of the embodiments disclosed here can be used in the described static load balancing environments, and such techniques can be used in dynamic load balancing environments or in still other load balancing environments.

Figure 2:
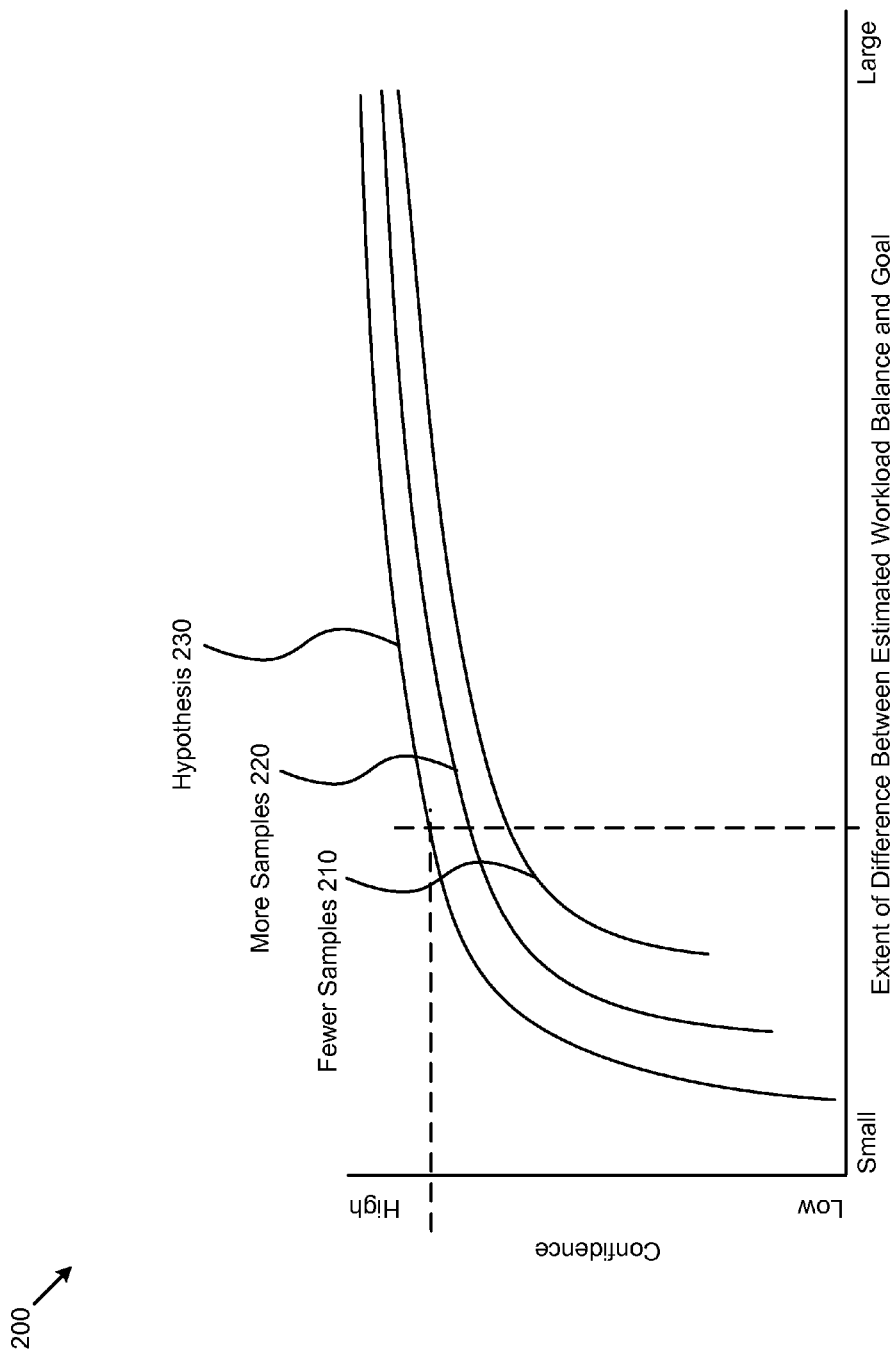
FIG. 2 is a chart showing a family of curves for implementing static load balancing using progressive sampling to achieve load balancing targets, according to some embodiments.

FIG. 2 is a chart showing a family of curves 200 for implementing static load balancing using progressive sampling to achieve load balancing targets. As an option, the present family of curves 200 may be implemented in the context of the architecture and functionality of the embodiments described herein. Also, the family of curves 200 or any aspect therein may be implemented in any desired environment.

As indicated in the discussion of FIG. 1, the progressive sampling engine 140 can produce a calculated workload variance 133 and a calculated instance of confidence level 134 that the workload is less than a maximum variation away from a workload target. Once calculated a point or points can be charted, or added to a table, or plotted. If still more points are calculated and charted, added to a table, or plotted, patterns and/or curves emerge. The chart of FIG. 2 shows a family of curves 200 where each of the shown curves corresponds to a particular number of samples. As shown, a first curve plots fewer samples 210, and another second curve plots more samples 220, and a third curve plots a hypothesis 230. Reading from this graph, it can be seen that for a given extent of difference between estimated workload balance and a workload balance goal, and for a given number of samples (see the first curve) a particular confidence is read from the ordinate. Similarly, and again reading from this graph, it can be seen that for a given difference between estimated workload balance and a workload balance goal (see abscissa), and given an additional number of samples (see the second curve), a higher confidence is read from the ordinate. Thus a hypothesis can be formed as to the additional number of samples that might be needed to achieve a workload variation less than a maximum workload variation from a target and, at the same time, the calculated confidence level is equal to or higher than a target confidence level threshold.

It may not be known a priori if the relationship between each from among the family of curves is linear or non-linear. Thus a generalized hypothesis might be phrased as: "Sample and evaluate a small number of additional input records in the expectation that sampling the additional small number of additional input records would improve the confidence level by a correspondingly small amount". Or, an alternate hypothesis might be: "It will be necessary to sample and evaluate a large number of additional input records in order to improve the confidence level by only a small amount".

Thus, it is possible to compute and re-compute the variance based on the machine-load-factor random variable defined above by repeatedly applying the known statistical rules for variance calculation. The variance that results will be a decreasing function of the number of input records sampled. Assuming the load-factor has a distribution with known inverse cumulative distribution function, it can be computed that the probability (confidence level) of a given maximum load factor would not be exceeded by any of the machine's load factors.

Figure 3:
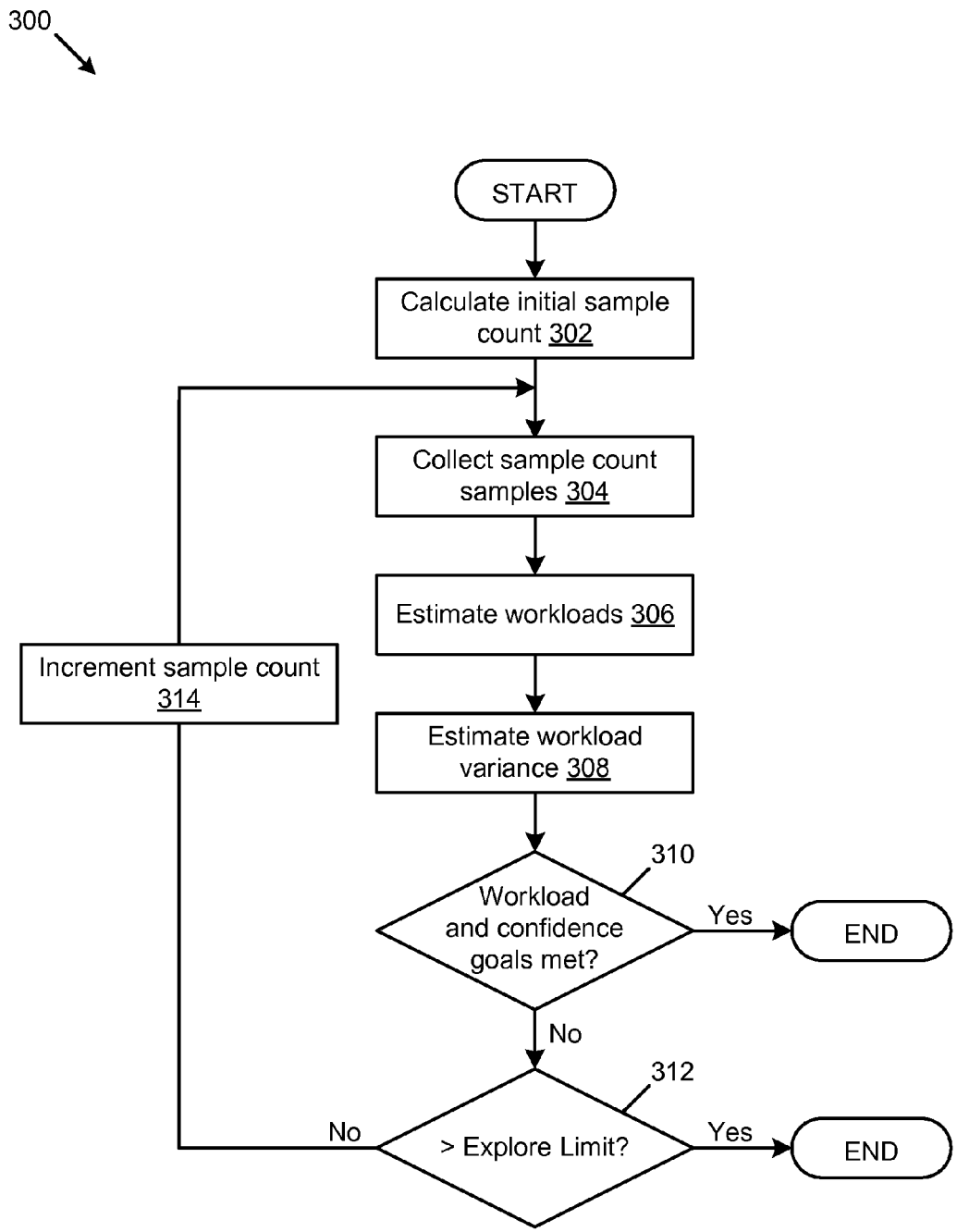
FIG. 3 is a simplified flow chart for implementing static load balancing using progressive sampling to achieve load balancing targets, according to some embodiments.

FIG. 3 is a flow chart 300 for implementing static load balancing using progressive sampling to achieve load balancing targets. As an option, the present flow chart 300 may be implemented in the context of the architecture and functionality of the embodiments described herein. Also, the flow chart 300 or any aspect therein may be implemented in any desired environment.

Given a maximum load factor goal (e.g., a deltaLoadFactor of 5%) and a minimum confidence level specification (e.g., a loadConfidence value of 0.95), the flow continues to repeatedly form a next hypothesis, test the hypothesis, and if the minimum confidence level specification is not met, then add additional samples and try again. As used herein, these successive tries are called progressive sampling. Iterations can continue in this manner (e.g., adding additional samples to a sample count) until a minimum variance is reached or until too much time or too many resources in the exploration have been spent (see FIG. 4), or until it is deemed that the cost of sampling is expected to be greater than the expected benefit (e.g., in the form of an improved workload assignment).

As shown in flow chart 300, an iteration commences when the system calculates an initial sample count (see Sample-Count of operation 302), and proceeds to collect Sample-Count samples (see operation 304). Given the samples, then the samples can be apportioned to workloads (e.g., possibly using any of the herein-disclosed workgroup splitting techniques), and the workloads can be estimated (see operation 306). Once the entire set of workloads have been estimated, the workload variance can be calculated (see operation 308) and a stopping condition can be calculated. For example, and as shown, one possible stopping condition occurs when both the workload variation and confidence levels have been met (see decision 310). That is, tests underlying the decision 310 include operations for comparing a workload variance (e.g., the workload variance over the plurality of worker tasks) to a maximum workload variance target. Or, it is possible that alternative stopping conditions are provided. For example, and as shown, it is possible that some time limit has expired, or that some limit on expenditure of resources has been exceeded. In such situations the sampling iterations end (see the Yes branch of decision 312). In the alternative, if none of the stopping conditions are present, then the system iterates by adding additional samples (see operation 314).

Some of the foregoing operations can be implemented in the aforementioned progressive sampling engine, and some exemplary implementations are presently discussed.

Figure 4:
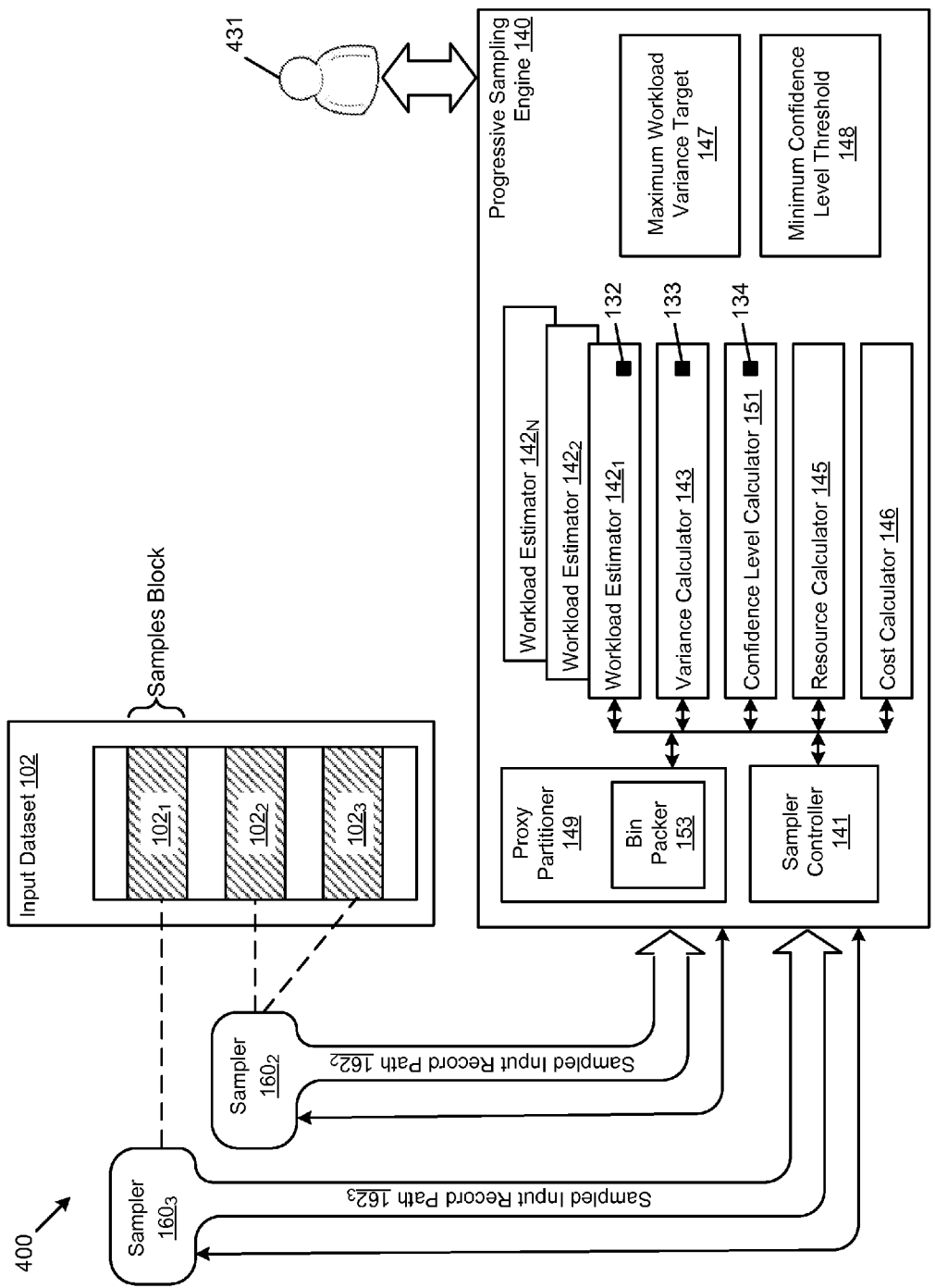
FIG. 4 is a block diagram of a subsystem for implementing static load balancing using progressive sampling to achieve load balancing quality targets, according to some embodiments.

FIG. 4 is a block diagram of a subsystem 400 for implementing static load balancing using progressive sampling to achieve load balancing quality targets. As an option, the present subsystem 400 may be implemented in the context of the architecture and functionality of the embodiments described herein. Also, the subsystem 400 or any aspect therein may be implemented in any desired environment.

As disclosed in the discussion of FIG. 3, one technique that can serve as a stopping condition (e.g., to stop sampling) is to stop when the workload variation and confidence goals are both met. Thus, by the end of an iteration, the system has calculated a probabilistic guarantee that the actual load for every worker will be within a variation of a variable δ (e.g., maximum workload variance target 147) of any other worker's expected load (e.g., the load provided by a workload estimator), and the guarantee needs to be within a probability greater than a variable α (e.g., a minimum confidence level threshold). Some embodiments use this calculation as a stopping condition. Parameters δ, α are inputs to the load balancer, and default values are 5% and 95%, respectively. More formally, one embodiment models the load on worker r ($Load_r$) as a random variable with an expected value equal to the estimated workload, thus:

$$Pr(\forall r, Load_r \leq (1+\delta)E(\cdot Load_r)) \geq \alpha \quad \text{(Eq. 1)}$$

It is possible to use Equation 1 to estimate the number of additional input record samples that are needed to reach a given confidence level by setting the equation given by Eq. 1 equal to the target confidence level, and the variable δ to a target maximum variation and then solving for the number of input-record samples needed to reach this goal. Knowing how many samples are expected to be needed to reach the goals can be used to formulate a next hypothesis.

Moreover, knowing how many samples are expected to be needed to reach the goals can be used to determine the most cost efficient mechanism for collecting those samples. In some cases an initial sampling might indicate that a parallel sampler might be efficient. For example, and as shown, the sampler 160 of FIG. 1 might be spawned multiple times to create a sampler (see sampler $160_2$) for retrieving some input records, and another sampler (see sampler $160_3$) for retrieving other input records.

Still further, knowing how many samples are expected to be needed to reach the goals can be used to determine whether collecting all these additional samples will be cost effective. In some embodiments, a user 431 can specify a maximum number of samples that may be taken, and if adding additional samples would exceed this maximum number of samples, this condition can be used as a stopping condition (see decision 312).

Even still further, knowing how many samples are expected to be needed to reach the goals can be used to determine if an estimated cost of sampling input records is expected to be less than or equal to an expected benefit (e.g., the expected benefit of approaching or achieving the load balancing target). For example, a precise additional number of input records is determined based on an estimated cost of sampling being less than or equal to an expected benefit accruing to approaching the load balancing target.

In addition to the aforementioned costs of sampling based on the number of samples, a cost arises merely from the cost of sampling individual input records. It can much more efficient to read entire blocks from the input and sample all the input records inside each block. As shown, a block of samples are present in input record block $102_1$, and an entire block of input records might be efficiently retrieved over sampled input record path 162, especially if the sampled input record path 162 is a wide or otherwise high bandwidth path.

If the input records within each input record block are not correlated with respect to a statistic that is being sampled then sampling the entire block of input records rather than sampling individual input records is expected to produce statistically similar results with respect to that sampled statistic.

Additional Embodiments Using Bin Packing

The assignment of workgroups to machines is performed using an arbitrary bin packing algorithm that attempts to maximize the probability given in Eq. 1. Bin packing can improve the quality of overall results, and can significantly reduce certain types of runtime skew. Strictly as examples of such classifications, skew in the runtimes of parallel tasks can be classified as data skew, computational skew, or machine skew. Data skew is caused by the act of assigning different tasks different amounts of data. Computational skew results from algorithms whose runtime depends on the content of the input rather than its size. Machine skew is caused by tasks being assigned to non-uniform computing resources. Data skew, and to a lesser extent, computational skew, can be mitigated by judicious use of dynamic assignment based on programmer-defined units of input data. Machine skew can be mitigated on through techniques involving the use of virtual processors, where more powerful nodes support more "task slots" and/or techniques involving speculative execution, where the same work is assigned to more than one task and the one that finishes first provides the output to any subsequent phase.

To improve the quality of the bin packing a single workgroup can be split into two or more subgroups by using a supplementary work record partitioning function. When splitting a workgroup, embodiments consider the following three issues:

How many subgroups to partition each workgroup into;
How to size these subgroups, and
How to assign the work records to these subgroups.

The criterion for splitting includes the use of the variance of the load induced by the new subgroup in the calculations. Possibilities for calculating the number of subgroups (e.g., how many subgroups to partition each workgroup into) include:

Bin packing based on a ceiling (e.g., workgroup-load/load-target): This technique minimizes the number of workgroups added while making a dense bin pack of the workgroups.
Bin packing based on a number of machines: Each subgroup can be assigned to a separate machine.
Bin packing based on either of the above with a minimum workgroup size constraint: As observed, splitting a single workgroup into subgroups can have negative ramifications that can be managed within limits and/or minimized. For example, each split of a workgroup might result in the allocation of a new file extent. While this can might improve the elapsed time for the job, over time it might result in data fragmentation.

Possibilities for calculating and/or assigning the size of subgroups include:

Size equally: This will tend to equalize the distribution of workgroup loads associated with each subgroup.
Size all except one to the load-target. This makes bin packing easier but makes the quality of the split more prone to estimation errors.

Possibilities for partitioning the work records into subgroups:

Hash partition the work records to the subgroups.
Range partition the work records into the subgroups based on a sampling of a supplied sub-partitioning variable.

In accordance with the above techniques, still further additional embodiments are envisioned, and are here-below briefly listed:

An embodiment where the input records can be divided into mutually exclusive workgroups.
An embodiment where a non-decreasing function determines the number of workgroups assigned to a respective worker task
An embodiment, where a workgroup is divided into subgroups, where each sub-group contains a subset of the input records to reduce the skew in workload across the plurality of worker tasks.
An embodiment where a decision of whether to split a workgroup into sub-groups is based on the load target of a worker task.
An embodiment where the number of sub-groups is determined based on a calculated ceiling (e.g. workgroup load estimate/load-target).
An embodiment where the number of sub-groups is determined based on the number of worker tasks.
An embodiment where the number of sub-groups is determined based a minimum workload constraint.
An embodiment where the division of sampled records in a workgroup among its sub-groups is such that the resulting workload of the respective sub-groups will be substantially equal.
An embodiment where the division of sampled records in a workgroup among its sub-groups is such that the resulting workloads of all but one of the respective sub-groups will be equal to a load target.
An embodiment where the method used to assign each sampled record in a workgroup to a sub-group is based on hashing.
An embodiment where the method used to assign each sampled record in a workgroup to a sub-group is based on sorting the sampled records using a total-ordering function.
An embodiment where the static load balancing assignment assigns the sub-groups of a respective workgroup to more than one worker task in order to reduce the skew in workload across the plurality of worker tasks.
An embodiment where a decision to continue sampling additional input records is based on a calculated resource usage being less than a pre-determined resource use limit.

Additional Embodiments of the Disclosure

Figure 5:
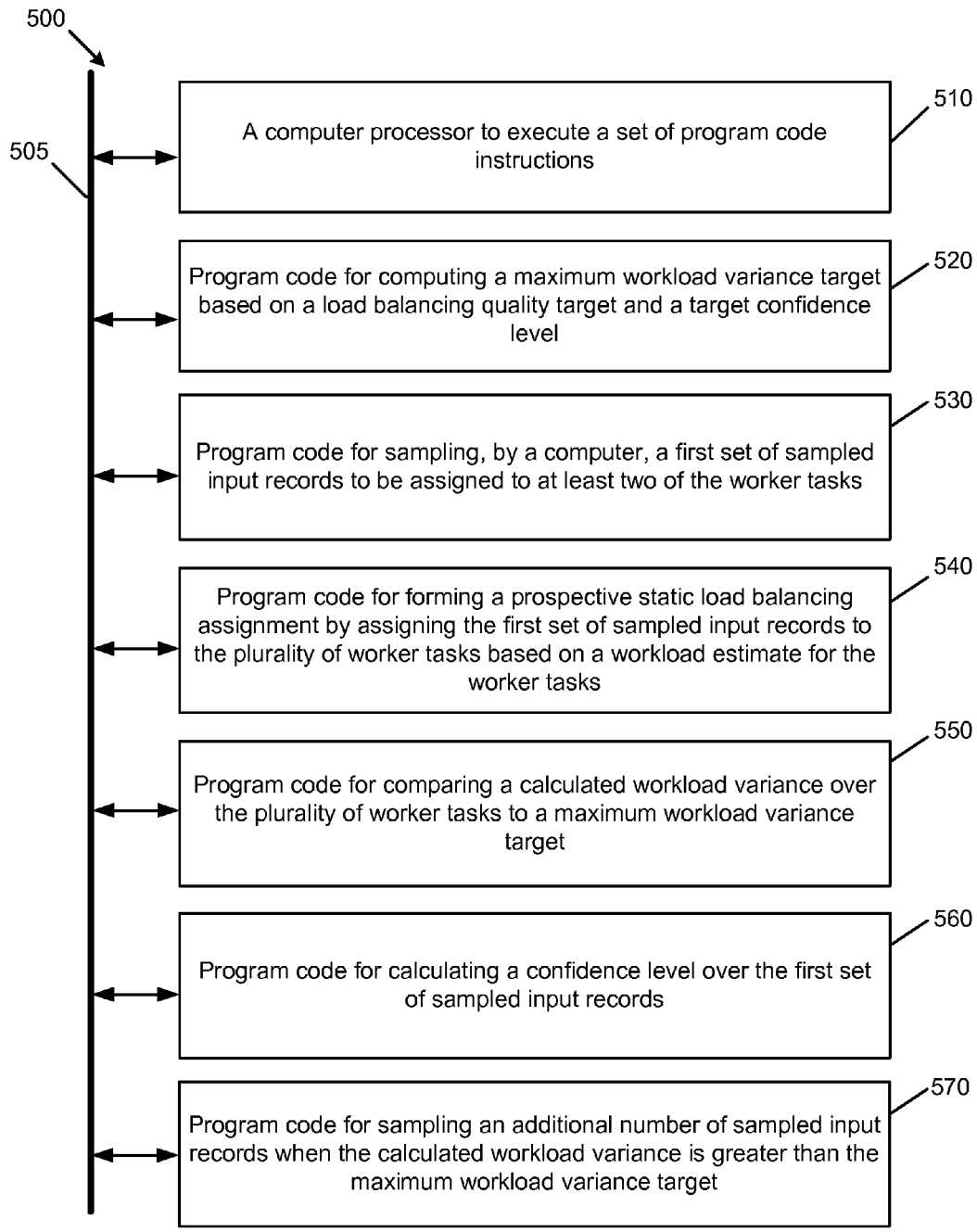
FIG. 5 is a block diagram of a system to perform certain functions of a computer system for implementing static load balancing using progressive sampling to achieve load balancing quality targets.

FIG. 5 is a block diagram of a system to perform certain functions of a computer system. As an option, the present system 500 may be implemented in the context of the architecture and functionality of the embodiments described herein. Of course, however, the system 500 or any operation therein may be carried out in any desired environment. As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform: computing a maximum workload variance target based on the load balancing quality target and the target confidence level (see module 520); sampling, by a computer, a first set of sampled input records to be assigned to at least two of the worker tasks (see module 530); forming a prospective static load balancing assignment by assigning the first set of sampled input records to the plurality of worker tasks based on a workload estimate for the worker tasks (see module 540); comparing a calculated workload variance over the plurality of worker tasks to a maximum workload variance target (see module 550); calculating a confidence level over the first set of sampled input records (see module 560); and sampling an additional number of sampled input records when the calculated workload variance is greater than the maximum workload variance target (see module 570).

System Architecture Overview

Figure 6:
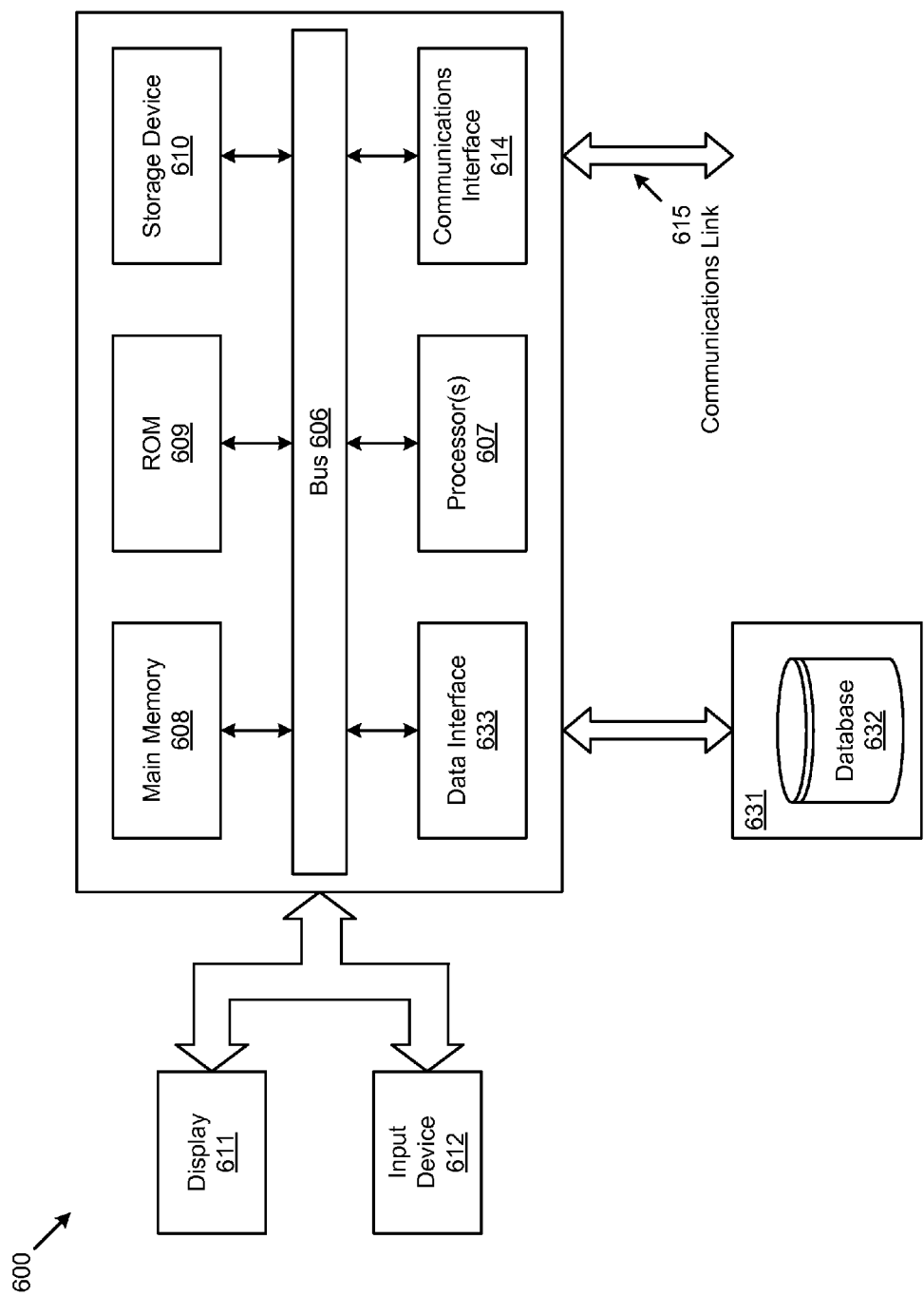
FIG. 6 depicts a block diagram of an instance of a computer system suitable for implementing an embodiment of the present disclosure.

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device (e.g., ROM 609), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory 608. Such instructions may be read into system memory 608 from another computer readable/usable medium, such as a static storage device or a disk drive 610. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more computer systems 600 coupled by a communications link 615 (e.g., LAN, PTSN, or wireless network) may perform the sequence of instructions required to practice the disclosure in coordination with one another.

Computer system 600 may transmit and receive messages, data, and instructions, including programs (e.g., application code), through communications link 615 and communication interface 614. Received program code may be executed by processor 607 as it is received, and/or stored in disk drive 610 or other non-volatile storage for later execution. Computer system 600 may communicate through a data interface 633 to a database 632 on an external data repository 631. A module as used herein can be implemented using any mix of any portions of the system memory 608, and any extent of hard-wired circuitry including hard-wired circuitry embodied as a processor 607.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for load balancing using progressive sampling to achieve a load balancing quality target over a plurality of worker tasks in a parallel processing environment, the method comprising:
computing the load balancing quality target comprising at least a maximum workload variance target for the plurality of worker tasks, and a target confidence level;
identifying a set of input records to be processed by the plurality of worker tasks in the parallel processing environment;
sampling the set of input records to form a first set of sampled input records
using a sampling engine separate from the parallel processing environment to perform:
identifying the first set of sampled input records to process;
forming a prospective load balancing assignment indicating how the set of input records are to be apportioned to the plurality of worker tasks, based at least in part upon the first set of sampled input records;
calculating workload estimates corresponding to the plurality of worker tasks, based at least in part upon the prospective load balancing assignment and the first set of sampled input records;
determining if the load balancing target is achieved, based at least in part upon the workload estimates; and if the load balancing target is not achieved, determining an additional number of input records to be sampled from the set of input records in order to achieve the load balancing target, sampling additional input records, and updating the prospective load balancing assignment based at least in part upon the additional input records; and processing the set of input records using the plurality of worker tasks in the parallel processing environment, based at least in part upon the prospective load balancing assignment.

2. The method of claim 1, wherein the additional number of input records is determined, at least in part, by comparing a calculated workload variance over the plurality of worker tasks to a maximum workload variance target.

3. The method of claim 1, further comprising calculating a confidence level over the first set of sampled input records based on a hypothesis test.

4. The method of claim 1, wherein a decision to sample the additional number of sampled input records is determined based on an estimated cost of sampling being less than or equal to an expected benefit accruing to approaching the load balancing target.

5. The method of claim 1, wherein the workload estimate for the worker tasks is a random variable that is returned by a non-decreasing function of the first set of input records that are assigned to a respective worker task.

6. The method of claim 5, wherein the non-decreasing function inputs a number of bytes used to represent a respective sampled input record.

7. The method of claim 1, wherein the first set of input records can be divided into mutually exclusive workgroups, and the load balancing assignment assigns workgroups to worker tasks.

8. The method of claim 7, wherein a workgroup of the mutually exclusive workgroups is further divided into subgroups to reduce the skew in workload across the plurality of worker tasks.

9. The method of claim 1, wherein a decision to continue sampling an additional number of input records is based on resource usage being less than a predetermined resource use limit.

10. The method of claim 1, wherein forming a prospective load balancing assignment comprises forming a static load balancing assignment.

11. A computer system for load balancing using progressive sampling to achieve load balancing quality targets over a plurality of worker tasks in a parallel processing environment, comprising:

a computer processor to execute a set of program code instructions; and a memory to hold the program code instructions, in which the program code instructions comprises program code to perform, computing the load balancing quality target comprising at least a maximum workload variance target for the plurality of worker tasks, and a target confidence level;

identifying a set of input records to be processed by the plurality of worker tasks in the parallel processing environment;

sampling the set of input records to form a first set of sampled input records;

using a sampling engine separate from the parallel processing environment to perform:

identifying the first set of sampled input records to process;

forming a prospective load balancing assignment indicating how the set of input records are to be apportioned to the plurality of worker tasks, based at least in part upon the first set of sampled input records;

calculating workload estimates corresponding to the plurality of worker tasks, based at least in part upon the prospective load balancing assignment and the first set of sampled input records;

determining if the load balancing target is achieved, based at least in part upon the workload estimates; and if the load balancing target is not achieved, determining an additional number of input records to be sampled from the set of input records in order to achieve the load balancing target, sampling additional input records, and updating the prospective load balancing assignment based at least in part upon the additional input records; and processing the set of input records using the plurality of worker tasks in the parallel processing environment, based at least in part upon the prospective load balancing assignment.

12. The computer system of claim 11, wherein the additional number of input records is determined, at least in part, by comparing a calculated workload variance over the plurality of worker tasks to a maximum workload variance target.

13. The computer system of claim 11, further comprising calculating a confidence level over the first set of sampled input records based on a hypothesis test.

14. The computer system of claim 11, wherein a decision to sample the additional number of sampled input records is determined based on an estimated cost of sampling being less than or equal to an expected benefit accruing to approaching the load balancing target.

15. The computer system of claim 11, wherein forming a prospective load balancing assignment comprises forming a static load balancing assignment.

16. A computer program product embodied in a non-transitory computer readable medium, the computer readable medium having stored thereon a sequence of instructions which, when executed by a processor causes the processor to execute a process to implement load balancing using progressive sampling to achieve load balancing quality targets over a plurality of worker tasks in a parallel processing environment, the process comprising:

computing the load balancing quality target comprising at least a maximum workload variance target for the plurality of worker tasks, and a target confidence level;

identifying a set of input records to be processed by the plurality of worker tasks in the parallel processing environment;

sampling the set of input records to form a first set of sampled input records;

using a sampling engine separate from the parallel processing environment to perform:

identifying the first set of sampled input records to process;

forming a prospective load balancing assignment indicating how the set of input records are to be apportioned to the plurality of worker tasks, based at least in part upon the first set of sampled input records;

calculating workload estimates corresponding to the plurality of worker tasks, based at least in part upon the prospective load balancing assignment and the first set of sampled input records;

determining if the load balancing target is achieved, based at least in part upon the workload estimates; and if the load balancing target is not achieved, determining an additional number of input records to be sampled from the set of input records in order to achieve the load balancing target, sampling additional input records, and updating the prospective load balancing assignment based at least in part upon the additional input records; and processing the set of input records using the plurality of worker tasks in the parallel processing environment, based at least in part upon the prospective load balancing assignment.

17. The computer program product of claim 16, wherein the additional number of input records is determined, at least in part, by comparing a calculated workload variance over the plurality of worker tasks to a maximum workload variance target.

18. The computer program product of claim 16, further comprising calculating a confidence level over the first set of sampled input records based on a hypothesis test.

19. The computer program product of claim 16, wherein a decision to sample the additional number of sampled input records is determined based on an estimated cost of sampling being less than or equal to an expected benefit accruing to approaching the load balancing target.

20. The computer program product of claim 16, wherein forming a prospective load balancing assignment comprises forming a static load balancing assignment.

\* \* \* \* \*

UNITED STATES PATENT AND TRADEMARK OFFICE
CERTIFICATE OF CORRECTION

PATENT NO. : 9,032,416 B2
APPLICATION NO. : 13/561383
DATED : May 12, 2015
INVENTOR(S) : Swart et al.

Page 1 of 1

It is certified that error appears in the above-identified patent and that said Letters Patent is hereby corrected as shown below:

In the drawings,

Drawing Sheet 1 of 6, figure 1, line 5, delete "Partotioner" and insert -- Partitioner --, therefor.

In the specification,

Column 3, line 55, delete "job" and insert -- job. --, therefor.

Column 8, line 26, delete "6" and insert -- δ --, therefor.

Column 8, line 32, delete "6, a" and insert -- δ, α --, therefor.

Column 10, line 22, delete "task" and insert -- task. --, therefor.

Column 12, line 14, delete "PTSN," and insert -- PSTN, --, therefor.

In the claims,

Column 12, line 53, Claim 1, delete "records" and insert -- records; --, therefor.

Signed and Sealed this
Ninth Day of February, 2016

Michelle K. Lee
*Director of the United States Patent and Trademark Office*